United States Patent
Labaquere et al.

(10) Patent No.: US 10,807,037 B2
(45) Date of Patent: Oct. 20, 2020

(54) PROCESS FOR CONTROLLING AIR PURIFICATION SYSTEMS

(71) Applicant: SUEZ GROUPE, Paris la Défense (FR)

(72) Inventors: Hervé Labaquere, Chatillon sur Chalaronne (FR); Arnaud Heinrich, Clamart (FR); Marie-Cécile De Chezelles, Levallois-Perret (FR)

(73) Assignee: SUEZ GROUPE, Paris la Défense (FR)

( * ) Notice: Subject to any disclaimer, the term of this patent is extended or adjusted under 35 U.S.C. 154(b) by 249 days.

(21) Appl. No.: 15/771,075

(22) PCT Filed: Nov. 4, 2016

(86) PCT No.: PCT/EP2016/076708
§ 371 (c)(1),
(2) Date: Apr. 25, 2018

(87) PCT Pub. No.: WO2017/077061
PCT Pub. Date: May 11, 2017

(65) Prior Publication Data
US 2018/0304195 A1    Oct. 25, 2018

(30) Foreign Application Priority Data
Nov. 6, 2015    (FR) ...................... 15 60666

(51) Int. Cl.
*B01D 53/30*    (2006.01)
*B01D 53/62*    (2006.01)
(Continued)

(52) U.S. Cl.
CPC ........... *B01D 53/30* (2013.01); *B01D 53/346* (2013.01); *B01D 53/62* (2013.01); *B01D 53/84* (2013.01);
(Continued)

(58) Field of Classification Search
CPC ...... B01D 53/30; B01D 53/346; B01D 53/62; B01D 53/84; B01D 2251/95;
(Continued)

(56) References Cited

U.S. PATENT DOCUMENTS

2007/0259416 A1    11/2007 Parker et al.
2007/0289206 A1*   12/2007 Kertz ...................... A01G 15/00
                                                    47/1.4
(Continued)

FOREIGN PATENT DOCUMENTS

DE    195 33 238 A1    3/1997
FR    2 945 215 A1    11/2010
(Continued)

*Primary Examiner* — Minh Chau T Pham
(74) *Attorney, Agent, or Firm* — Baker & Hostetler LLP

(57) ABSTRACT

A computerized process for controlling an air purification system comprises a bioreactor in particular, the system may include a photobioreactor for treating urban air, in particular for $CO_2$ removal. The system may be connected to the sanitation network and/or to a (drinking and/or municipal) water supply network. The connection and the drainage system may in particular maintain a fluidic isolation between the two types of networks. The system may optionally be equipped with measurement sensors and/or actuators that make it possible to control the internal activity of the bioreactor. Various control modes of a grid of bioreactors are described. Data on the status of the connected networks (e.g. water, sanitation, cooling, heating networks) contribute to the control of a network of geolocalized bioreactors. The software aspects are described. The supervision of the grid of bioreactors may in particular be carried out remotely via onboard communication devices.

28 Claims, 5 Drawing Sheets

(51) Int. Cl.
*B01D 53/84* (2006.01)
*B01D 53/34* (2006.01)

(52) U.S. Cl.
CPC .... *B01D 2251/95* (2013.01); *B01D 2257/504* (2013.01); *B01D 2258/06* (2013.01); *B01D 2259/4591* (2013.01); *B01D 2259/802* (2013.01); *Y02A 50/2342* (2018.01); *Y02A 50/2358* (2018.01); *Y02C 10/02* (2013.01); *Y02C 10/04* (2013.01)

(58) Field of Classification Search
CPC .......... B01D 2257/504; B01D 2258/06; B01D 2259/4591; B01D 2259/802; Y02C 10/02; Y02C 10/04; Y02A 50/2342; Y02A 50/2358
USPC ....... 95/186; 435/257.1, 292.1, 286.1, 286.5, 435/136, 170, 161, 160, 167, 168, 266
See application file for complete search history.

(56) References Cited

U.S. PATENT DOCUMENTS

| | | | |
|---|---|---|---|
| 2008/0178739 A1* | 7/2008 | Lewnard | B01D 53/84 95/186 |
| 2012/0003705 A1* | 1/2012 | Jin | C12P 7/649 435/136 |
| 2013/0344574 A1* | 12/2013 | Morgan | C12M 21/02 435/257.1 |
| 2014/0186931 A1 | 7/2014 | Gonzalez et al. | |
| 2019/0127675 A1* | 5/2019 | Adams | C12M 21/02 |

FOREIGN PATENT DOCUMENTS

| | | |
|---|---|---|
| JP | 57-112870 A | 7/1982 |
| JP | 5-336948 A | 12/1993 |
| WO | 2007/130408 A2 | 11/2007 |
| WO | 2013/011448 A1 | 1/2013 |
| WO | 2014/063229 A1 | 5/2014 |

* cited by examiner

PROCESS FOR CONTROLLING AIR PURIFICATION SYSTEMS

CROSS-REFERENCE TO RELATED APPLICATIONS

This application is a National Stage of International patent application PCT/EP2016/076708, filed on Nov. 4, 2016, which claims priority to foreign French patent application No. FR 1560666, filed on Nov. 6, 2015, the disclosures of which are incorporated by reference in their entirety.

FIELD OF THE INVENTION

The invention relates to processes for controlling air purification systems, and to systems for purifying the air, in particular urban air, said systems being in particular remotely controlled and/or being controlled using various types of feedback control.

BACKGROUND

A carbon sink or carbon dioxide ($CO_2$) sink is a natural or artificial reservoir which absorbs carbon from the atmosphere and contributes to decreasing the amount of carbon dioxide in the atmosphere. Such reservoirs are variable in size. The main natural carbon sinks are the oceans, soils (humus, peatbogs) and certain living environments (growing forest). The carbon sinks considered by industrialists comprise bioreactors, generally based on the process of photosynthesis.

Patent application FR2945215 discloses for example a process for treating the atmospheric air characterized in that it consists in placing a reservoir in the environment to be treated, this reservoir containing a medium in which autotrophic microorganisms, such as algae, grow by means of a photobioreaction drawing energy from a light source (18) placed in or in proximity to the reservoir, the reservoir allowing exchanges between the medium and the air of the environment to be treated, the autotrophic microorganisms generating calcified elements from the carbon dioxide present in the environment to be treated. This approach has drawbacks, which prevent the widescale use of such installations. For example, one significant problem resides in the need to collect the compost, which is troublesome in an urban environment (e.g. logistics, smells) and also from an economical standpoint.

There is a need for advanced air treatment processes and systems, in particular in the urban environment.

SUMMARY OF THE INVENTION

The present invention relates to a computerized process for controlling an air purification system comprising a bioreactor. In particular, the system may comprise a photobioreactor for treating urban air, in particular for $CO_2$ removal. The system may be connected to the sanitation network and/or to a (potable and/or municipal) water supply network. The connection and the drainage system may in particular maintain fluidic isolation between the two types of networks. The system may optionally be provided with measurement sensors and/or actuators that make it possible to control the internal activity of the bioreactor. Various modes for controlling a grid of bioreactors are described. Data on the status of the connected networks (e.g. water, sanitation, cooling, heating networks) contribute to the control of a network of geolocalized bioreactors. Software aspects are described. The grid of bioreactors may in particular be monitored remotely via embedded communication devices.

A device for regulating a microalgae bioreactor is disclosed, allowing its connection from the urban public space to a collective sanitation network and thus allowing a virtuous circle of carbon dioxide sequestration and biogas production to be set up.

A device for regulating a microalgae bioreactor is disclosed, allowing its connection from the urban public space to a collective sanitation network and thus allowing a virtuous circle of carbon dioxide sequestration and biogas production to be set up.

Advantageously, the carbon sink according to the invention may be incorporated within street furniture.

Advantageously, the carbon sink according to the invention can be or is connected to the urban sanitation network.

Advantageously, by making use of the existing sanitation networks, the invention adds value in terms of a new economic use for these sanitation networks.

Advantageously, appropriate and/or automated management of the drainage of the biochemical reactor maintains maximum $CO_2$ absorption capacity, for example by optimizing the growth of the microalgal biomass.

Advantageously, embodiments of the invention make it possible to measure the amount of organic matter emptied into the network and in particular to prevent the emergence of offensive odors, olfactory and/or visual pollution, or even pests (e.g. cockroaches, maggots, other insects, rats, etc.) into the public space.

Advantageously, the carbon sink according to the invention may be networked. Developments describe the management of a bank or network of urban sinks: such networks of urban sinks may be controlled according to various modalities.

Advantageously, in addition or instead, the system according to the invention allows the production of biogas.

Advantageously, the system according to the invention allows a virtuous circle of carbon dioxide sequestration to be set up.

Advantageously, the system according to the invention addresses many major concerns of contemporary towns and cities: a) reducing greenhouse gases b) improving urban air quality c) producing renewable energy.

Advantageously, the processes and systems according to the invention play a role in the energy transition.

Advantageously, according to the embodiments, the processes and systems according to the invention may be applied to the treatment of (i) $CO_2$-rich urban air (road traffic areas, metro exits, car parks); (ii) the treatment of industry (exhaust/flue gases in industrial air, e.g. boilerhouses, incinerators, etc.); but also to (iii) the treatment of air in the home ("enhanced houseplant").

Advantageously, in one embodiment, the system according to the invention improves the quality of the air by sequestering carbon dioxide.

In some embodiments, certain chemical compounds (e.g. pollutants) and/or particles, or classes of particles, are sequestered (e.g. precipitated and removed).

DESCRIPTION OF THE FIGURES

Other features and advantages of the invention will become apparent with the aid of the following description and the figures of the appended drawings, in which.

DETAILED DESCRIPTION OF THE INVENTION

Figure 1:
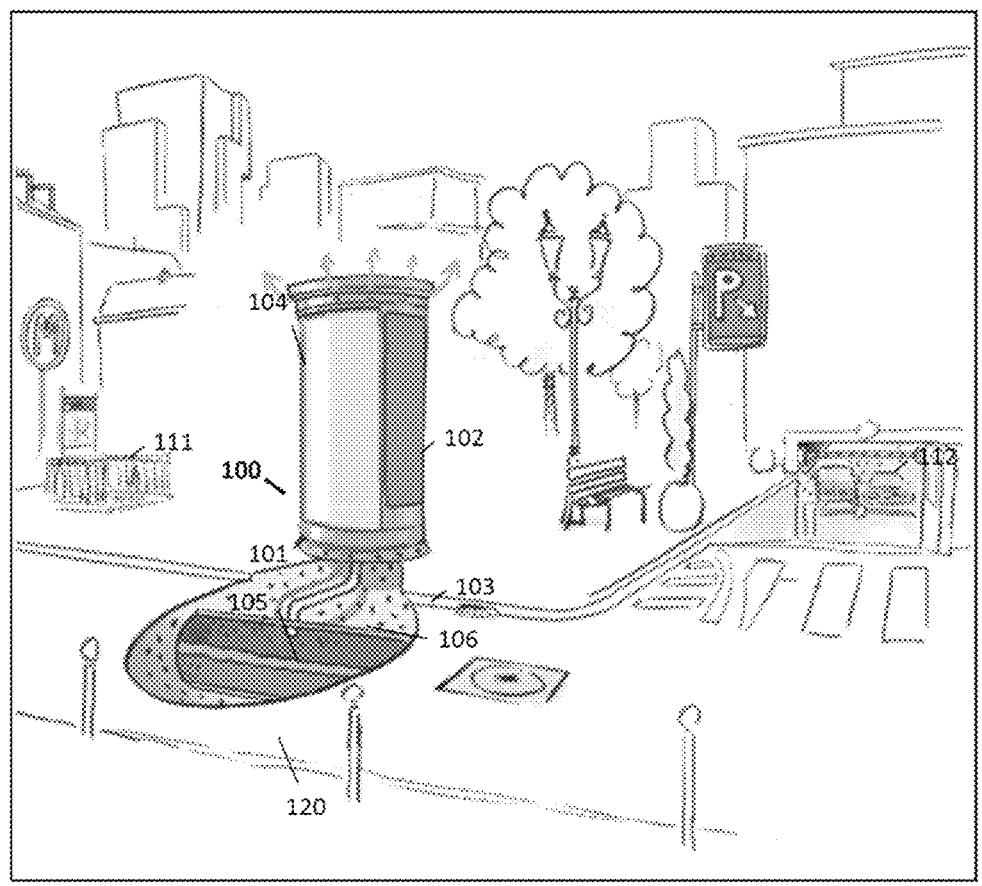
FIG. 1 illustrates one particular example of an embodiment of the invention specific to the urban environment.

The general principle of the invention consists in placing a biochemical reactor in the environment, in controlling the biochemical reactions taking place in this reactor, for example by injecting matter and/or energy thereinto, and, after biochemical treatment within the reactor, in recovering the transformed matter and/or energy, either directly or indirectly. At least a portion of the biochemical agents from the reactor is directed into a network 120 (for example a public sanitation network). The management of a bank or of a network consisting of a plurality of reactors may be controlled according to various modalities.

The systems and the processes according to the invention may be broken down into a number of variants. Variants comprise in particular the number and the type of reactor, the type and capture and/or emission surfaces of by-products of the reactor, the type of connection to one or more networks—for example but not limited to public sanitation networks, the modalities for controlling a network consisting of a plurality of at least partially interconnected reactors, the general size of the installations (from millimeter-scale to major installations, of skyscraper type), etc.

Various embodiments are described hereinbelow.

A computer-implemented process for controlling an air purification system comprising a bioreactor is disclosed, the process comprising the steps consisting in receiving measurements of the levels of concentration of one or more pollutants and/or particles in air streams at the inlet and at the outlet of a bioreactor containing water and a biomass at least partially removing a portion of these pollutants and/or particles; according to the control parameters comprising the received concentration level measurements, determining a volume of biomass to be drained from the bioreactor into a sanitation network connected to the bioreactor.

In one development, the process further comprises a step consisting in draining said determined volume of biomass into said sanitation network.

In one development, the process comprises a step consisting in reintroducing a volume of water into the bioreactor, for example after drainage. The fresh water may also be introduced before combined water/biomass drainage.

The water supply (bioreactor inlet) and biomass removal (bioreactor outlet) are interdependent variables (or may be correlated or managed together). In some embodiments, fresh water is not added from the network, but solely from an integrated cistern. In some embodiments, an additional filter allows almost all of the water of the culture medium to be refreshed. In some embodiments, the volume of biomass removed is compensated for by an equivalent volume of fresh water.

The sanitation network may be a public network (i.e. the sewerage system) or a private network (for example an industrial network).

A bioreactor may contain various microbiological agents which are able to treat (atmospheric, ambient, industrial, urban, home, etc.) air by removing (i.e. filtering out and/or fixing and/or precipitating out and/or metabolizing) certain chemical compounds present in the air, in particular one or more pollutants and/or toxic or harmful particles.

To maintain optimum air purification or treatment efficiency, i.e. optimum metabolism in the bioreactor, it is advantageous to drain it partially, at certain times, in certain proportions and under certain judiciously chosen conditions.

An (atmospheric) pollutant is a chemical substance that is in excess relative to a predefined threshold.

A pollutant is a physical or chemical biological alterant, which beyond one or more predefined thresholds, and sometimes under certain conditions (potentialization), brings about negative effects on all or part of an organism, an ecosystem or the environment in general. A pollutant may in some cases be defined as a contaminant of one or more components, of an ecosystem (air, water, soil) and/or of an organism (e.g. humankind) or having a negative impact on the ecosystem beyond a predefined threshold or (scientific and/or legal) standard.

Pollutants may be variable in nature (they may be solid, liquid or gaseous), anomalously present in a given environment. Pollutants may be "micropollutants", i.e. active (organic or inorganic) products which are toxic at very low concentrations (of the order of µg/l or lower) or "macropollutants", i.e. substances or molecules, which may or may not be natural in origin, present in the environment at abnormal concentrations and having negative effects on living organisms.

The term "particulate matter" refers to particles suspended in Earth's atmosphere. Particulate matter as a whole is now classed as a human carcinogen.

The nonlimiting list of the pollutants and/or particles that can be/are handled by the processes or the systems according to the invention comprises in particular: sulfur dioxide ($SO_2$), nitrogen oxides ($NO_x$) including nitrogen dioxide ($NO_2$), fine particulates $PM_{10}$, $PM_{2.5}$, carbon monoxide (CO), benzene ($C_6H_6$), arsenic (As), cadmium (Cd), nickel (Ni), lead (Pb), polycyclic aromatic hydrocarbons (PAHs) such as benzo[a]pyrene (BaP) and greenhouses gases more generally (e.g. carbon dioxide $CO_2$, superoxidizing ozone $O_3$, nitrous oxide $N_2O$, sulfur hexafluoride $SF_6$ and halocarbons including CFCs).

The biological treatment of the air may also relate to deodorization, for example using bacteria which capture odorous organic molecules such as mercaptans and hydrogen sulfide.

In one development, the bioreactor is connected to a water supply network for supplying the culture medium of said bioreactor.

The water supply (bioreactor inlet) and biomass removal (bioreactor outlet) are independent variables (or may be correlated or managed together). In some embodiments, fresh water is not added from the network, but solely from an integrated cistern. In some embodiments, an additional filter allows almost all of the water of the culture medium to be refreshed. In some embodiments, the volume of biomass removed is compensated for by an equivalent volume of fresh water.

In one development, the purified air is the atmospheric air, in particular the atmospheric air in the urban environment. The geolocation of one or more reactors may be optimized so as to optimize the air treatment.

In one development, at least one pollutant is a gaseous pollutant in the atmospheric air, preferably the greenhouse gas $CO_2$ (i.e. beyond a certain natural and/or legal threshold).

In one particular case, the invention may consist of a carbon sink.

In such a case, $CO_2$ levels are measured at the inlet and at the outlet (continuously, periodically, intermittently or opportunistically, i.e. upon an event). If $CO_2$ fixation slows down, it may for example be determined that there is an excess of biomass; in this case, a portion of the biomass is removed and/or fresh water is added to the culture medium.

In one development, the bioreactor is a photobioreactor and the control parameters comprise parameters associated with the internal activity of the bioreactor, these parameters comprising one or more data chosen from: the pH, the temperature, the turbidity, the conductivity measured in the culture medium of the bioreactor, and the luminous flux received by the culture medium of the bioreactor.

In one development, the control parameters further comprise data external to the bioreactor, these external data comprising data associated with the state of the sanitation network and/or data associated with the state of the network supplying the bioreactor with water.

The data external to the bioreactor comprise data relating to the system inlet (water) and to the outlet (sanitation). The data relating to the sanitation network comprise data on the water/sludge level, maintenance data, topological, topographical or map data, etc. The data associated with the state of the network supplying the bioreactor with water comprise data on water quality, pressure, flow rate, maintenance data, etc.

In one development, the control parameters comprise measurement data of the level of the wastewater present in the sanitation network. The expression "level of wastewater" also refers to the "level of circulating effluent" or the "level of sludge".

In one development, the control parameters comprise measurement data and/or weather forecasts.

Meteorological data may have direct or at least indirect consequences for the sewerage system level. High sludge levels (heavy rain) will tend to increase the capacity for carrying away the biomass drained off. However, high levels may also occasionally overload the treatment plants downstream, thereby generally favoring bioreactor drainage when levels are low in the sanitation network.

In one development, the process further comprises management rules for determining the volume of biomass to be drained off (the volume to be drained off is determined by applying management rules, e.g. according to fuzzy logic or an expert system).

The management rules may be predefined. They may be, either entirely or partially, capable of remote modification. The rules make it possible to manage the biomass (influx of light, provision of water, provision of nutrients, etc.) in particular to optimize growth cycles, stop activity if necessary, etc. The rules may be static and/or invariant. The rules may be dynamic (e.g. concatenated rules).

In one development, the bioreactor comprises remotely controllable actuators and/or measurement sensors for controlling the activity of the reactor.

In one development, the process comprises a step consisting in receiving the data associated with a plurality of bioreactors connected to one and the same sanitation network, which sanitation network is potentially connected to one or more biogas production plants.

In one development, the plurality of bioreactors is connected to one and the same water supply network for supplying the culture medium of the bioreactors.

The plurality of bioreactors connected to one and the same sanitation network constitutes a network or a grid. The bioreactors are geolocalized; their respective geographical siting is or can be determined. Whether monitored as a whole or by peer-to-peer negotiation, the neighboring states of a given bioreactor may be known.

In one development, the process comprises a step consisting in controlling the plurality of bioreactors according to geolocation data of said bioreactors, data associated with the state of the sanitation network and/or data associated with the state of the network supplying the bioreactor with water and/or data associated with the state of biogas production.

The control of the grid of bioreactors may in particular comprise steps of multi-objective optimization, the objectives being associated with one or more bioreactors and/or with the sanitation network and/or with the water supply network and/or with downstream biogas production.

The process for controlling the grid or the network of bioreactors may in particular aim to maximize the fixation of $CO_2$ from the atmospheric air by means of one or more bioreactors. It is also possible to seek, subsidiarily, to maximize the production of biogas from the biomass drained from one or more bioreactors.

In one development, the objectives or criteria for optimizing one or more bioreactors comprise minimizing, maximizing or optimizing the sequestration of one or more predefined types of matter (pollutants/particles) in the environment by means of one or more bioreactors, the qualitative and/or quantitative state of growth of the biomass present in one or more bioreactors, the gaseous emission of or release of solid or liquid predefined types of matter from one or more bioreactors.

In one development, the criteria for optimizing the release of matter from a bioreactor into the sanitation network comprise taking external weather forecast data into account, these data comprising in particular pluviometry, temperature and insolation data.

A computer program product is disclosed, said computer program comprising code instructions for carrying out one or more of the steps of the process when said program is run on a computer.

An air treatment system is disclosed comprising means for implementing one or more steps of the process.

In one development, the system comprises a bioreactor, air inlets and outlets; the bioreactor being configured to be connected to a sanitation network for draining off at least a portion of the biomass.

The reactor may be fixed and installed in the urban environment, but it may also be removable and/or temporary. It is suitable for connection to a sanitation network, but may include additional means for draining off (for example excess) biomass.

In one development, the bioreactor is a photobioreactor comprising photosynthetic microorganisms.

The photosynthetic microorganisms suspended in the water may be photosynthetic bacteria and/or cyanobacteria and/or eukaryotic microalgae and/or cells isolated from multicellular plants and/or macroalgal gametophytes and/or moss protonemata. As the case may be, the reservoir, tank or container containing the biomass is at least partially transparent to light (generally made of glass or transparent or translucent plastic).

In one development, the bioreactor is connected to a water supply network for supplying the culture medium of the bioreactor.

In one development, the water supply network is a pretreated non-potable municipal water supply network.

The reactor according to the invention does not have to be connected to a water supply network at its inlet at all: the reactor according to the invention may be "pre-filled" with water. Advantageously, it may be possible to connect it and/or it may be connected to a water supply network, which water supply network may be a potable water supply network and/or a non-potable municipal water supply network (pretreated Seine water).

In one development, the system further comprises a system for draining the bioreactor maintaining fluidic isolation between the water supply network and the sanitation network.

In one development, the drainage system comprises at least two reservoirs and remotely controllable electrically controlled valves, the reservoirs being configured to be drained alternately so as to maintain fluidic isolation between the water supply network and the sanitation network.

In one development, the bioreactor is connected to a heating network and/or a cooling network.

In one development, the connected bioreactor according to the invention comprises a device for controlling the temperature of the bioreactor. The temperature of the bioreactor may be controlled, in particular by means of a heat exchanger and/or a heating network and/or heating equipment.

A heat exchanger may be used (gas cooler or heating device) but advantageously the system according to the invention will be coupled with existing infrastructure, such as a heating network (urban heating network or private or industrial heating network) or a cooling network. The heating network may be a (e.g. private or public) steam network, or a geothermal network. A cooling network is equivalent to a heating network, but dedicated to the transport and distribution of "frigories" rather than calories.

In one development, the system comprises one or more artificial light sources for controlling the activity of the bioreactor.

Optionally, the system according to the invention may comprise reflectors and/or concentrators of natural light, to enhance the activity of the bioreactor.

In one development, the system comprises one or more photovoltaic panels for supplying one or more artificial light sources with power.

Optionally, the system according to the invention may comprise reflectors and/or concentrators of natural light, to enhance the activity of the bioreactor.

In one development, the system comprises one or more sensors chosen from a pH meter, an interior thermometer, an exterior thermometer, an oxymetry probe, a level sensor, a conductivity sensor for measuring the conductivity of the culture medium, a sensor for measuring the level of $CO_2$ in the air of the bioreactor and/or of the atmosphere, a sensor for measuring the level of $O_2$ in the air of the bioreactor and/or the atmosphere and a sensor for measuring the dissolved $CO_2$ in the culture medium of the biomass.

In one development, the bioreactor further comprises one or more actuators for controlling the inlet and/or outlet air flow rates, and/or for agitating the biomass of the reactor, and/or for controlling the influx of natural and/or artificial light and/or for controlling the temperature. The term "to control" means in particular "to be able to regulate/adjust".

In one development, the inlet and/or outlet air flow rates of the bioreactor can be controlled or configured (in particular remotely). The I/Os are in particular remotely controllable. They allow aerobic and/or anaerobic operation, depending on the type of reactor used. In one development, the connected bioreactor according to the invention comprises one or more ventilation devices. These devices comprise for example one or more fans and/or compressors.

In one development, the connected bioreactor according to the invention further comprises one or more actuators for agitating the biomass of the reservoir.

In one development, the connected bioreactor according to the invention further comprises one or more actuators suitable for controlling or configured to control the influx of natural and/or artificial light. The system according to the invention may comprise shades or roller blinds for example. The opacity of the glass or walls of the reservoir exposing the microalgae may also be controlled.

In one development, the connected bioreactor according to the invention comprises one or more accesses for the injection of biological and/or chemical compounds into the bioreactor. For example, the system according to the invention may comprise accesses allowing the injection of products such as fertilizers, solvents, additives or dyes into the reactor.

In one development, the connected bioreactor according to the invention further comprises means for draining off at least a portion of the biomass which are independent of the sanitation network. Excess, unneeded or ineffective biomass may be drained off locally, without going through the sanitation network (or not exclusively going therethrough, for example temporarily or as backup).

In one development, the system further comprises a communication device allowing the activity of the bioreactor to be remotely controlled.

In one development, the system further comprises a bidirectional communication device allowing the activity of the bioreactor to be remotely controlled.

The activity of the bioreactor is controlled in particular by managing the addition of water, the biomass drained off, the amount of light or nutrients.

The data from the sensors may be accessed remotely. The actuators may be controlled remotely (control of the activity of the bioreactor, in particular by controlling the addition of water, nutrients, solar/natural light influxes, agitating the biomass and aeration).

In one development, the system comprises a plurality of bioreactors.

The bioreactors may be sited in a predefined geographic area so as to maximize $CO_2$ sequestration and/or to maximize $O_2$ emissions into the atmosphere of the geographic area.

In one development, one or more bioreactors are connected to one or more biogas production devices.

A bioreactor may be associated with a biogas production unit in immediate proximity. In the general case, the biogas production entity is located some distance away. A plurality of bioreactors may be connected via the sanitation network to a biogas (e.g. methane) production and treatment plant.

FIG. 1 illustrates one particular example of an embodiment of the invention specific to the urban environment.

In one embodiment, such as illustrated in FIG. 1, the reactor is a photobioreactor (PBR) or a microalgae bioreactor 100. Microalgae are exposed to light through transparent surfaces 101 (in this example, the glazed surfaces are sited on an item of street furniture of Morris column type 102). The carbon sink is incorporated within or takes the form of an item of street furniture installed in the public space. The microalgae carry out biochemical photosynthesis cycles and constitute a carbon sink: carbon dioxide is partially sequestered or fixed by the algae and dioxygen is released into the environment 104. The biomass of the microalgae varies with time. At a certain predefined threshold, and according to various modalities, a portion of the created biomass is drained off, for example via drainage 106 pipes 105, into one or more sanitation networks 120. In one particular embodiment, the effluent, composed of microalgae and their culture medium, arising from the $CO_2$ absorption process, is drained off via a particular connection 105 to the urban sanitation network 120.

A carbon sink 100 according to the invention may be sited in a judicious, opportune, strategic, suitable or optimal location in the public space, i.e. in a location in which the urban air is particularly rich in $CO_2$. For example, the carbon sink may be sited in proximity to a metro air vent 111 and in proximity to a garage exit 112.

More generally, in terms of sequestration, urban locations with high $CO_2$ emissions make propitious sites for the installation of the system according to the invention: road tunnels, interchanges, areas of particularly busy road traffic such as the Paris orbital, etc. Furthermore, in terms of emissions, favorable sites comprise sensitive areas such as schools, hospitals or densely populated urban residential areas. Computer models and/or measurements relating to the circulation and to the quality of the air may make it possible to optimize the various trade-offs made between optimizations in terms of $CO_2$ (and/or pollutant) sequestration and optimizations in terms of dioxygen (or other chosen by-product).

The embodiments use one or more bioreactors arranged in series and/or in parallel. A bioreactor ("fermenter" or "propagator") is a system in which microorganisms (e.g. yeasts, bacteria, microscopic fungi, algae, animal and plant cells, either homogeneously or in combination) are cultivated to produce biomass and/or a metabolite or else to carry out the bioconversion of a molecule of interest.

A bioreactor generally includes a) a reservoir, tank or container, for example made of glass or of stainless steel; the reservoir may be planar (glass plates containing microalgae) or circular in shape, or take any other shape b) accesses for the circulation of air between the internal environment and the external environment (these accesses may be temporarily closed or blocked) c) accesses for the injection of water and/or nutrients (fertilizer) and/or chemical compounds (solvents, additives, dyes); the water injected into the culture medium may be potable and/or non-potable water, for example water from the Paris pre-treated Seine water supply network; in other words, the reactor according to the invention may use feedwater and/or tapwater d) optionally actuators (for example a stirring system for mixing or circulating the biomass in the reactor (e.g. impellers, articulated arms, etc.) e) sensors (for measuring the temperature, the pH, the dissolved oxygen concentration, the interior level, etc.); the sensors may therefore comprise one or more pH meters, thermometers, oxymetry probes, pressure sensors, level sensors, etc. These various sensors or probes may be positioned as appropriate and optimal within the bioreactor so as to obtain an accurate representation of the internal biodynamics of the reactor.

A bioreactor is generally controlled by a computer-implemented monitoring and control system, allowing all of the operational parameters of the reactor to be measured, recorded and controlled. A bioreactor may, in certain cases, be autonomous, i.e. self-controlled through the implementation of management rules requiring no external intervention. In certain cases, the bioreactor according to the invention may comprise an emergency stop reservoir (in the event of runaway biomass creation, it may be stopped by injecting bleach or a mixture comprising herbicidal and/or fungicidal fluids).

In one embodiment, the bioreactor comprises a photobioreactor (based on the photosynthesis cycle). This type of reactor is known. Patent application FR2978159 discloses for example a photobioreactor for the closed-circuit production of a concentrated algal solution including a container containing the algal solution, and a means for exposing the algal solution to light; the exposure means comprises at least one vertical sleeve made of a flexible, transparent material that is resistant to tensile stresses, this sleeve being suspended from a support and filled with a liquid which endows this sleeve with a cylindrical shape, which makes contact via its outer wall with the algal solution.

In some other embodiments, other types of reactors may be used, either in combination with or instead of the photobioreactor, i.e. according to different biochemical processes (e.g. using bacteria whose function has been determined by means of synthetic biology or genetic engineering techniques).

In one embodiment, one or more dyes may be used. In this way, an item of street furniture implementing the invention could appear to the public in various colors (e.g. pink, blue or several colors) and not necessarily green (as may be the case with microalgae).

In one embodiment, the reactor according to the invention may further comprise one or more artificial light sources. For example, the system according to the invention may comprise light-emitting diodes (LEDs) or grow lights, the light spectrum of which may be suitable or optimized for the growth of microalgae (absorption bands specific to photosynthesis).

In one embodiment, the reactor according to the invention may comprise means for capturing solar luminous flux, potentially including concentration means (e.g. reflective panels, reflectors, lenses, etc.) and/or means for modulating the influx of light (e.g. roller or Venetian blinds, tiltable shades, variable opacity of the glazed surfaces, etc.)

In one embodiment, the reactor according to the invention may comprise a combination of natural and artificial light influxes. Advantageously, artificial light sources may compensate for temporary deficits in natural luminosity, via batteries and/or solar panels for example. Even without occasional deficits, the use of artificial sources may allow the microalgae to maintain high levels of photosynthesis. Numerous ways of controlling the activity of the bioreactor become possible. For example, photovoltaic panels recharged during the day may power light sources during the night and allow the algae to grow, thereby allowing uninterrupted photosynthesis by the microalgae (or equivalent). The combined use of two types of sources may also allow a constant luminous flux to be maintained.

The (artificial and/or natural) luminous flux passing through the glazed, transparent or translucent surfaces (exposing the microalgae for cycles of photosynthesis) may be configured and/or controlled so as to regulate the growth of the biomass. For example, shades or blinds may allow the luminous flux to be modulated as appropriate. The opacity of the glazing may also be configurable (applying an electric current may darken or lighten glazing). In one embodiment, one or more miniature reactors are incorporated within solar panels having configurable opacity.

The systems according to the invention are highly variable in size.

In one embodiment, a reactor of "urban" type may have a capacity of 1 $m^3$ of microalgae, which is equivalent to the dioxygen production of around 50 trees (e.g. *Platanus*). A carbon sink containing 1 $m^3$ of microalgae fixes around 1 tonne of $CO_2$ per year, releases more than 600 kg of oxygen into the air of the town or city, produces more than 350 m³ of biomethane and allows more than 3500 kWh of biogas to be injected into the network.

In one embodiment, a reactor (of "industrial" type) implemented by the invention may have a capacity of 6000 m³ (representing 5000 tonnes of $CO_2$ sequestered per year, which is of the order of magnitude of the biomass equivalent to the Bois de Boulogne, which has an area of 850 ha).

The concrete embodiments of the systems and processes according to the invention may therefore be broken down in multiple ways, in particular into those taking the form of street furniture (e.g. Morris column, bus shelter, advertising boards, roofs, etc.), urban infrastructure (e.g. glazed roofs, pavements, etc.), industrial installations (e.g. an air treatment reactor in proximity to industrial areas), domestic appliances (e.g. an enhanced air purifier connected to the sewerage network, etc.). The surfaces exposing the microalgae or the biochemical agents are therefore variable in area, from a few square meters to buildings that are entirely covered by glazed, transparent or translucent surfaces exposing the microalgae or biochemical agents.

In one embodiment of the invention, the air ventilation may be natural, i.e. the network of bioreactors captures carbon dioxide in proximity to the installations. Additional ventilation means may also be used to increase or optimize $CO_2$ capture. The urban air ventilation and/or concentration and/or compression means may in particular comprise one or more fans. A fan may be incorporated within the street furniture comprising a bioreactor. A plurality of fans may also be incorporated within the street furniture or within the bioreactor itself. The fans may be variable in size, from macroscopic (e.g. from fans on the scale of decameters to millimeter-scale ventilation devices) to microscopic (e.g. using MEMS) orders of magnitude.

In one embodiment, a compressor known from the prior art may be used, for example having a power of 75 W. In such a configuration, for a reactor of around 1 m³, the peak inlet air flow is generally of the order of 6 m³/h and the mean inlet air flow is of the order of 2 m³/h.

The direction of the wind and more generally of the local airflows around the urban installations comprising the fans may be modeled and/or measured (for example by means of anemometers, e.g. laser anemometers mounted on the item of street furniture and/or arranged in an array of independent sensors coupled with the systems according to the invention).

According to one aspect of the invention, an urban air purification system is disclosed, including a connection to the sanitation network.

The sanitation network is generally public (the sewers). In some embodiments, in addition to or instead of the public sanitation network, private, "proprietary" or dedicated networks may be used.

The compost or effluent may be removed (exclusively) via the connection to the sanitation network. Advantageously, this embodiment requires no dedicated logistics.

In one variant embodiment, the compost or effluent may be removed (exclusively) by physically taking it away; for example garbage trucks access the dried compost aggregate or surplus via hatches. Automated vehicles or drones may collect the, for example concentrated, aggregate. Advantageously, this embodiment does not require access to the sanitation network.

In one embodiment, the compost or effluent may be removed partially by physical collection and partially by connection to the sanitation network. Advantageously, this embodiment allows networking to be optimized, i.e. the optimization of the distribution of carbon sinks according to the invention throughout the urban environment (multicriteria optimization with regard to the capture of the matter to be transformed, the emission of the transformed matter, the removal of by-products according to the availability of access points to the sanitation network, etc.)

Figure 2:
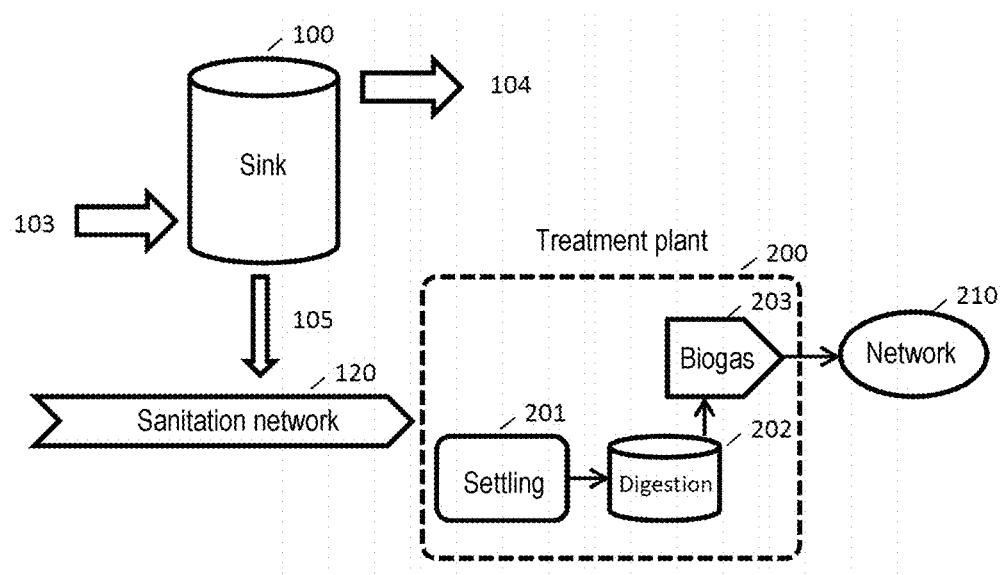
FIG. 2 illustrates one embodiment of the invention for treating urban air.

FIG. 2 illustrates one embodiment of the invention for treating urban air.

The carbon sink 100 captures the ambient urban air 103, gives off dioxygen 104 into the atmosphere and excess microalgae 105 go into the sanitation network 120. The effluent from the carbon sink according to the invention is added to and combined with wastewater streams, which reach the treatment plant 200. After a first settling step 201, the sludge is digested (by bacteria) in step 202 and biogas 203 is produced (by methanation, or another process), which is reinjected into the energy networks 210.

In one particular embodiment, the system according to the invention may comprise a microalgae photobioreactor 100. The process of sequestering atmospheric carbon dioxide 103 is coupled with a process of transforming the carbon into biohydrocarbon 203 by methanation. The microalagae are transported to a treatment plant 200 possessing a methanation pathway and contribute, as an organic substrate, to said methanation pathway 203.

The photobioreactor 100 may comprise single-celled algae of the *Chlorella* genus, which sequester $CO_2$. Numerous other types of strain are possible, allowing in particular the fixation, the capture, or the precipitation of particles present in the (urban or industrial) air. One of the processes subjacent to the operation of the bioreactor according to the invention is therefore that of photosynthesis.

In some variants, $CO_2$ may also be absorbed by means of amine solvents, in particular ethanolamine (2-aminoethanol). In coming into contact with acid gases (such as $CO_2$), an aqueous solution of 2-aminoethanol forms a salt at room temperature. The solution is then transported to a closed environment in which it is heated to around 120° C., which, according to Le Chatelier's principle, results in the release of (pure) $CO_2$ and the regeneration of the 2-aminoethanol in aqueous solution. Alternatives to this chemical process comprise absorption techniques employing rapid variation in temperature/pressure, gas separation, cryogenics or else the use of hydroxides.

Lastly, other embodiments of the invention may comprise entirely different biochemical processes.

Figure 3:
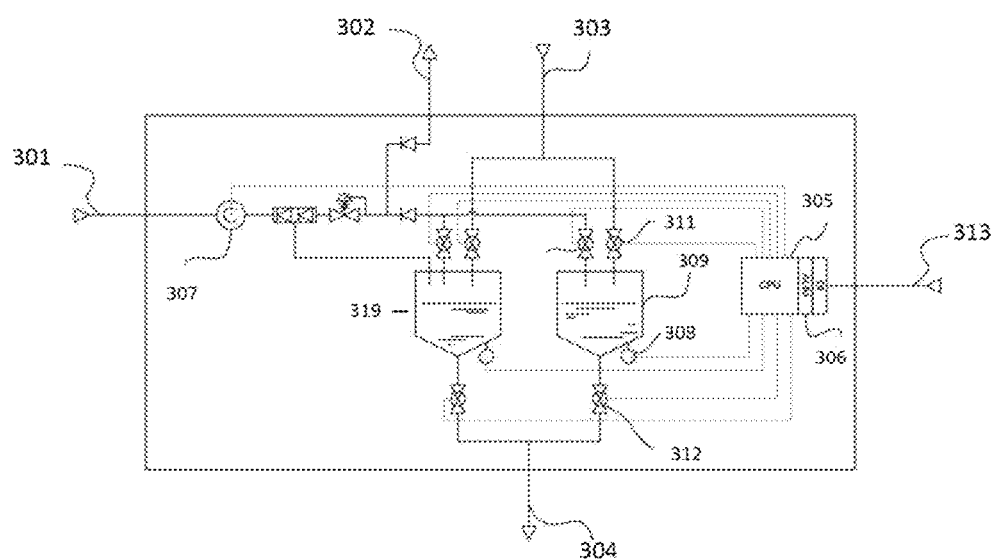
FIG. 3 shows aspects of one example of a reactor drainage system for connection to the sanitation network.

FIG. 3 shows aspects of one example of a reactor drainage system for connection to the sanitation network.

The expression "process water" refers to the water produced by the industrial process according to the invention. In this instance it is water loaded with microalgae (at least in some embodiments) and/or liquid constituting the culture medium of the microalgae.

The diagram of FIG. 3 shows in particular the operation of the system for removing (draining off) the process water via the sanitation network. The interface between the $CO_2$ absorption process and the sanitation network may be formed by a specific drainage system.

The drainage system according to the invention includes a connection to the water supply network 301 (which may comprise potable and/or non-potable water, for example water from the Paris pre-treated Seine water supply network), a process water feed 302 (for the cultivation of microalgae), a conduit for waste process water loaded with algae 303, a drain into the sanitation network 304 and a control/power terminal 306 (electrical power supply).

An external control signal 313 arising from automated monitoring or from a human operator orders the electrically controlled valve 311 to open, allowing the reservoir 309 to fill. After the valve 311 is closed, the weight is measured by the load cell 308 then the reservoir is drained via the drain connection 304 by controlling the electrically controlled valve 312. After the valve 312 is closed, the weight is measured again by the load cell 308. The mass of the solution removed is obtained by differencing between the preceding two measurements.

The sequenced opening of the electrically controlled valves 311 and 312 ensures hydraulic disconnection with respect to the sanitation network. Stated otherwise, the disconnection of the reservoirs means that the valve for feeding in process water 311 is closed during the phase of emptying into the sanitation network, for which the valve 312 is open.

During the phase of filling the reservoir 309, the volume of fresh water injected into the process is measured by the volumetric flow meter 307. A daily balance is set up by the central control unit 305 by differencing between the mass of incoming water and the mass of solution leaving the device.

The deposition of organic matter in the reservoir 309 is prevented by a non-stick interior coating in association with a cleaning cycle triggered by the electrically controlled valve 312 control.

In the embodiment of the invention comprising the microalgae culture, the risk of the microalgae migrating out or escaping via the various conduits (e.g. to 301, 302 or 303) is low or negligible, given that the microalgae are dependent on light (microalgal excursions will therefore be spatially limited). In the embodiments of the invention using different biochemical processes, the drain conduits may comprise check valves and/or be chemically treated so as to minimize or to prevent the escape of biochemical agents.

In one embodiment, the system according to the invention may comprise a load cell 308, which measures for example the resistance to a current modified according to the exerted force. Various techniques relating to weighing volumes of sand on vacuum trucks may be used. Other complementary techniques for measuring the weight of the microalgae are possible. For example, measurements (for example optical measurements) of algal concentration may be combined with the volume measurement (e.g. by measuring the level or thresholds).

In general, the system according to the invention may comprise a plurality of reservoirs arranged in parallel.

In one particular embodiment of the invention, the system may comprise two reservoirs arranged in parallel. In this dual configuration, drainage is carried out in alternation. The use of two storage reservoirs 309 and 319 arranged in parallel allows sequenced or alternating operation which ensures that the process is continuously supplied with fresh water and ensures hydraulic disconnection with respect to the sanitation network. One given reservoir acts as a "buffer" with respect to the other and allows a "drip" flow rate to be maintained, i.e. fresh water is constantly added to the photobioreactor.

The use of a large number of photobioreactors arranged in parallel lessens the risk of the entire system failing.

Figure 4:
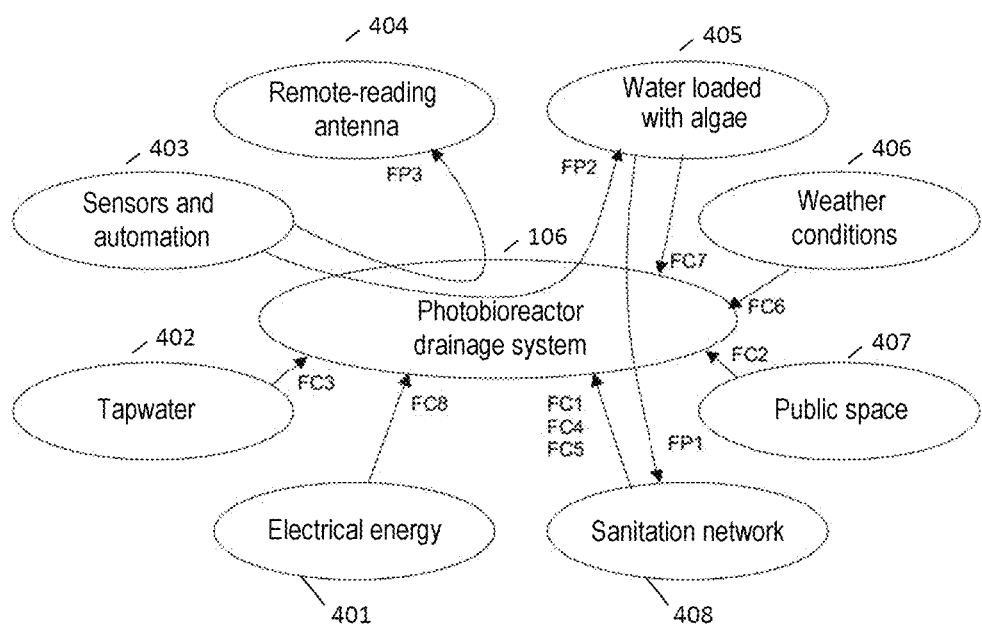
FIG. 4 illustrates exemplary aspects of the invention, in particular modes for managing the connected reactor and optional features.

FIG. 4 illustrates exemplary implementations of the invention, in particular modes for managing the connected reactor and optional features.

In one embodiment, the photobioreactor 106 may be sited in the public space 407, connected to the sanitation network 408 and be supplied with feed- or tapwater 402 and electrical power 401. The reactor may be provided with sensors and automated systems 403, and include communication means, for example a remote-reading antenna 404. This remote-reading antenna 404 allows in particular bidirectional communication between the system 106 according to the invention and a (human and/or machine) monitoring station. A control signal triggers the actuation of electrically controlled valves resulting in the process water loaded with algae 405 being drained into the storage reservoirs (for example 309) before being drained off into the sanitation network 408. The measurement of the mass of removed algae 405 is obtained by differencing between the weight of the incoming fresh water and the weight of the wastewater leaving the device, by means of various sensors.

Various aspects of managing a connected reactor according to the invention are described below.

In general, the temperature, the pH and the organic matter concentration of the effluent may be decreased by dilution: water (which may comprise potable and/or non-potable water, for example non-potable water from the Paris pre-treated Seine water supply network) may be added to reach the required predefined minimum values.

In one embodiment, a minimum level of water may be left at the bottom of the reservoir (for example 309) after drainage to prevent odors emerging from the sanitation network 408 in the manner of a siphon. The reservoirs are for example provided with a vent with an activated carbon filter.

A disconnection device (303, 311, 309, 308, 311) protects the municipal water supply network.

In one embodiment, the process water passes through storage reservoirs 309 and 319, the fill and drain valves of which are opened in alternation.

The effluent may be removed by flushing, which generally has the effect of cleaning the drain pipes and prevents the accumulation of solid matter. Optionally, the reservoirs are provided with a nonstick interior coating.

Weather forecasts may advantageously be taken into account when controlling the release of effluent; for example, rain or storm alerts transmitted via embedded communication means or remote-reading antennas 404 increase the chance of high levels in the sanitation networks, in which case drainage operations may be postponed for certain portions of the grid or network of connected bioreactors according to the invention or else brought forward i.e. implemented opportunistically in certain other sectors.

Certain specific reservoir shapes and their nonstick interior coating may contribute to preventing the deposition of organic matter. In certain cases, an operation of rinsing with supply water may be performed (daily or according to local measurements).

The system according to the invention may comprise an urban casing (potentially provided with instruments) comprising a photobioreactor (generally provided with instruments), connected to the sanitation network (which is monitored).

In one embodiment, the urban casing or shell (e.g. Morris column, bus shelter, building façade, pavement or sidewalk portion or public toilet (potentially pay toilet)) may comprise sensors (e.g. photovoltaic panels or equivalent, with or without batteries, presence or motion detectors, sensors for measuring inlet and outlet $CO_2$ levels, for measuring dioxygen or a determined pollutant at the inlet and/or at the outlet, etc.) and/or actuators (speakers, remotely actuated blinds, etc.). The bioreactor casing may comprise one or more fans (air inlets and/or outlets), accesses for removing compost or portions of the biomass, and accesses for adding nutrients. In some embodiments, the containment shell of the bioreactor may also comprise means for releasing perfume (to negate or mask undesirable smells), means for producing sound, computer display screens (e.g. displaying tourist maps; displaying visual or text information does not exclude exposing the microalgae, which may grow behind semi- or partially transparent screens), projection means (projecting information on the pavement or walls), computing means (e.g. processors) and communication means (which may be wired or wireless, specific to the system according to the invention and/or for use by public relay antennas), etc. Tangible and/or logic means corresponding for example to social functions may be made available to the public (e.g. reports on the health of the biomass, images showing its growth) or even means allowing public interaction.

With respect to the bioreactor, a certain number of parameters may be monitored and/or controlled. These parameters may comprise in particular (for example and if applicable): the $CO_2$ level of the inlet air, the $CO_2$ level of the outlet air, the dissolved $CO_2$ level (for example in the culture medium), the compressor (fan) outlet pressure, the turbidity (e.g. rheology measurements of the biomass inside the reactor), the microalgae concentration by optically measuring the density of the culture medium, the internal temperature (measured at various points in the bioreactor), the temperature outside the reactor (for example the temperature measured in the street), influxes of light (in particular insolation and/or artificial light level measurements), the pH (acidity or basicity of the biomass medium or of the process water), the conductivity (of the biomass medium or of the process water, the redox potential, $NO_3$ and/or $PO_4$ concentrations.

In one embodiment, the temperature of the reactor may be controlled by means of a connection to an existing heating network and/or geothermally and/or by using a heat exchanger placed in proximity to the sanitation network.

An alarm may be triggered in the event of negative performance, for example if the mean $CO_2$ removed becomes negative.

According to the embodiments (and according to the given types), the data may be sampled every 30 seconds, every five minutes, every 15 minutes, once an hour or according to predefined (and/or configurable) thresholds.

The bioreactor or urban casing may comprise one or more sensors, the measurements from which allow, after the information has been processed by a computing unit, the amount of organic matter drained off into the sanitation network to be measured. In one embodiment, the waste or effluent from the bioreactor is measured and monitored (qualitatively and/or quantitatively), in particular remotely (e.g. by means of wired or wireless communication means, by remote reading, which may be encrypted or unencrypted, etc.). The remote-reading system may in particular be unidirectional or bidirectional.

A certain number of parameters relating to the sanitation network may be monitored and/or controlled. These parameters may comprise in particular: the water level (so as to adjust the drainage operations to opportune times and/or suitable locations on the grid of networked bioreactors), the physical properties of the sludge measured locally or overall and statistically (e.g. pH, turbidity, conductivity, redox potential, $NO_3$ and/or $PO_4$ concentrations).

In general and nonlimitingly, the sensors (or detectors) embedded in the system according to the invention (for example in the urban casing of the photobioreactor and/or in the bioreactor itself and/or in the sanitation network) may comprise one or more sensors or detectors chosen from pressure, flow, temperature, oxygen, speed, motion, position, location, radioactivity or energy sensors, or sensors for detecting chemical compounds or products (e.g. nitric oxide, ozone, smoke, pollutants, etc.) or biological compounds or products (e.g. viruses, contaminants, pollen, etc.). The sensors may comprise one or more MEMS, magnetometers, hygrometers, gyroscopes, accelerometers, biosensors, radars, sonars, cameras, 3D scanners, etc.

In general and nonlimitingly, the actuators may be pneumatic, hydraulic, electrical, mechanical, magnetic, piezoelectric or electroluminescent actuators or make use of the Peltier effect, etc. They may for example comprise one or more hydraulic cylinders, motors, heating resistors, lamps, speakers, electromagnets, or else heater-coolers, ionizers, valves, winders, etc.

In general, the monitoring of the overall system covers the control of i) the urban casing and of its sensors/actuators, ii) of the bioreactor per se and iii) the sanitation network. Overall monitoring may comprise the reception, analysis and prediction of meteorological data. For example, rain forecasts may influence the various drainage operations of the networked bioreactors (some areas will be drained before others for example). Factors linked to temperature and to light directly affecting the growth of the biomass may also be tracked.

The overall system and/or one or more reactors in particular may be monitored automatically, semiautomatically or manually. This monitoring may take place remotely and/or locally (certain operations may require certain authorizations and/or a physical on-site presence). The system may be controlled in a fixed (control station) and/or mobile manner. In general, a web portal including web services and/or software applications (apps) may allow access to the tracking data of the reactors and/or may make it possible to take control thereof. Via one or more, potentially secure, apps, a variety of terminals may be used for consulting the data and/or taking control of a reactor or of a grid of reactors, in particular smartphones, tablets, laptops or servers. Access rights may be defined. User interfaces employing touchscreen, augmented and/or virtual reality technologies may be used.

Figure 5:
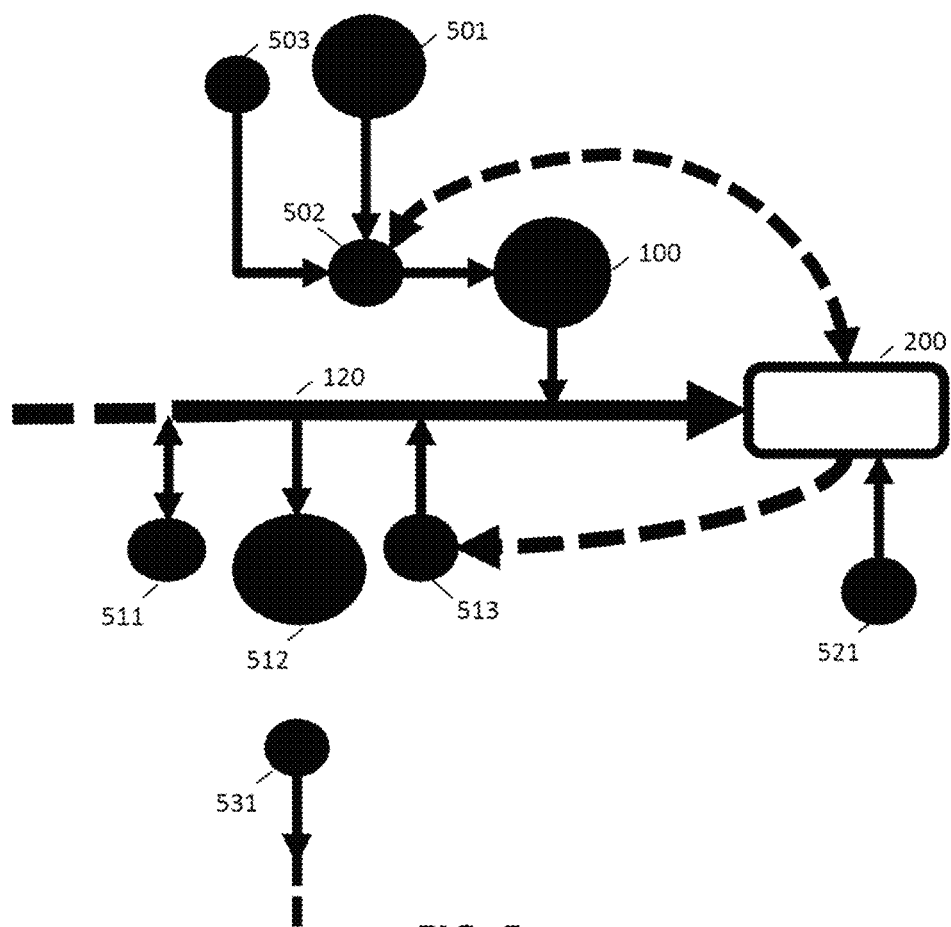
FIG. 5 shows one exemplary embodiment of a network of bioreactors according to the invention.

FIG. 5 shows an exemplary network of bioreactors, i.e. a plurality of reactors interconnected to the sanitation network. Certain sinks are photobioreactors, others are not (e.g. bioreactors using genetically modified bacteria). In terms of topology, the sinks 100, 511, 512 and 513 are directly connected to the sanitation network and the sinks 501, 502, 503 are indirectly connected via the sink 100. The reactor 511 is bidirectional: it may release effluent into the sanitation network but also extract matter therefrom, for example for treatment (in the manner of the reactor 512). The sink 513, like the sink 100, is a carbon sink comprising a photobioreactor releasing its effluent into the sanitation network. The sink 100 is a photobioreactor networked with several other reactors. In this example, the sink 502 is a Morris column according to the invention and the sink 100 is an adjacent bus shelter, the biomass reservoirs of which are in communication with one another. The sink 501 corresponds to a building façade implementing a system according to the invention. The sink 503 is a glazed sidewalk portion according to the invention. The sink 531 is a sink according to the invention that can be connected, but is not connected, to the network 120. For this sink 531, the microalgal compost may be collected on site (or emptied into another sanitation network distinct from the network 120). The treatment plant 200 may take part in the overall control.

Various modes for controlling a network of carbon sinks that are or can be connected are described below.

The control modes may be variable and controllable in various ways, from upstream to downstream, i.e. from the capture of air and/or pollutants, the activity of the bioreactor, the management of effluent removal, the measured or simulated wastewater levels in the sanitation networks, weather forecasts and their consequences in terms of dilution, etc.).

FIG. 5 shows a bank or a network of carbon sinks that are and/or can be connected to the sanitation network 120 which leads to the treatment plant 200, which plant produces biogas which is reinjected into the energy networks.

The topology of the graph of interconnected reactors allows more or less sophisticated control, i.e. with multiple and various types of feedback. The graph corresponds to a grid of interconnected entities. This grid of carbon sinks may be monitored by applying complex system control systems (formal logic, fuzzy logic, peer-to-peer negotiation, voting mechanisms), regardless of whether this control is partially carried out by human (human operator or supervisor) and/or carried out by machine (local decisions made by computer, reflex arcs, etc.).

The sink reactors may be provided with instruments (i.e. provided with measurement sensors specifying the state of growth of the biomass or numerous other parameters such as temperature, concentration, etc.), along with the sanitation network (e.g. work underway, topography, pollutant loads or concentrations at various locations, etc.).

Furthermore, alongside or by means of measurement sensors quantifying reality, empirical and/or theoretical monitoring models may allow the system as a whole to be controlled. The system perimeter may comprise models of the airflows and air quality (e.g. at different levels of granularity, for example from street level to the scale of the entire conurbation), the network of sinks (e.g. reactor types, biomass cycles, capacities, etc.), the sanitation network itself (e.g. water levels, maintenance work, weather forecasts, etc.) and the treatment network (e.g. cycles of settling, methanation, etc.).

In one embodiment ("push"), the downstream portion does not control the upstream portion (even partially). For example, the treatment plant 200 is passively "subjected" to the cumulative discharge from the networked carbon sinks. Control may then take place upstream if need be, for example by determining the load of the downstream treatment plant (e.g. observed, measured, calculated or simulated). The sinks may for example communicate with one another, "dialog", by implementing peer-to-peer decision-making systems to vote or to decide on which reactors will be allowed to be drained, according to which sequences, etc.

In one embodiment ("pull"), the downstream portion controls the upstream portion (at least partially). For example, depending on its load and on its own methanation cycles, the treatment plant 200 directly or indirectly controls the drainage operations of the upstream carbon sinks. In the case of a mixed bank (combining photobioreactors and synthetic biology reactors using genetically modified bacteria), the treatment plant 200 may influence (or authorize, promote, weight, facilitate, accelerate, delay, prevent or postpone) the drainage operations of certain sinks, taking into account the cumulative dilution effects or the resulting composition of the collected wastewater.

In some ("hybrid") embodiments, both upstream and downstream portions contribute in various ways to control as a whole. For example, if certain reactors observe that treatment downstream is being overwhelmed, they will increase the opacity of the surfaces exposing the microalgae in order to slow down the growth of biomass. If a local need for air purification becomes urgent (beyond a certain predefined threshold), because an inhabited area becomes polluted, and at the same time the downstream absorption capacity does not allow short-term removal, a one-off drainage operation (by truck or removal of a compost after drying) may allow one-off or "peak" problems on the network to be solved. Since not all of the reactors are provided with dual removal modes (physical compost and sewerage network), managing the graph subjacent to the network of carbon sinks according to the invention may allow alternative solutions.

Examples of the management of the grid or network of bioreactors are described below (the scenarios are in no way limiting). In a first scenario, if work is taking place in a particular area of the sanitation network, the (human and/or machine) supervisor may temporarily stop the drainage operations of the bioreactors of the area in question and/or decrease the metabolism of the bioreactors by decreasing the amount of light supplied thereto. In a second scenario, a pollution alert has been issued, and the activity of the bioreactors may be maximized as far as possible for each of the bioreactors. In a third scenario, if the urban air quality is deemed to be satisfactory, the amount of light supplied will be able to sustain the activity of the algae without going beyond to a purification mode. In a fourth scenario, severe storms have been forecast, and the bioreactors that are close to biomass saturation may be drained in advance in order to take advantage of the carrying capacity and the photovoltaic panel batteries could be fully recharged so as to allow continued illumination in the low light levels during the bad weather. In a fifth scenario, in the event of a high level in the sanitation network (rain and/or floods and/or during peak hours, e.g. a football match), this high level generally leads to the downstream treatment plants being overwhelmed and/or malfunctioning (and may lead to untreated waste in the environment), and drainage operations will generally be avoided in this type of situation. Alternatively, drainage sequences may be envisaged as appropriate between areas (inter-area) and/or within areas (intra-area), etc. In a sixth scenario, the treatment plant is undergoing maintenance, and drainage operations will be avoided as far as possible.

The present invention may be implemented on the basis of hardware and/or software elements. It may be available as a computer program product on a computer-readable medium. The medium may be electronic, magnetic, optical or electromagnetic. The terms "computer program" and "software" are used here in a general sense to refer to any type of computer code (for example, application software, microsoftware, micro-code, or any other form of computer instruction) which may be used to program one or more processors so as to implement aspects of the techniques described here. The computing means or resources may in particular be distributed ("cloud computing"), possibly using peer-to-peer technologies. The software code may be run on any suitable processor (for example a microprocessor) or processor core or set of processors, whether these are provided in a single computing device or distributed between several computing devices (for example such as potentially accessible in the surroundings of the device).

The invention claimed is:

1. A computer-implemented process for controlling an air purification system comprising a bioreactor, the process comprising the steps of:
   receiving measurements of the levels of concentration of one or more pollutants and/or particles in air streams at the inlet and at the outlet of a bioreactor containing water and a biomass at least partially removing a portion of these pollutants and/or particles;

according to the control parameters comprising the received concentration level measurements, determining a volume of biomass to be drained from the bioreactor into a sanitation network connected to the bioreactor and a volume of water to be reintroduced into the bioreactor;

draining said determined volume of biomass into said sanitation network;

resupplying the bioreactor with the determined volume of water;

the control parameters further comprising data external to the bioreactor, these external data comprising data associated with the state of the sanitation network and/or data associated with the state of the network supplying the bioreactor with water.

2. The process as claimed in claim 1, wherein the bioreactor is connected to a water supply network for supplying the culture medium of said bioreactor.

3. The process as claimed in claim 1, wherein the purified air is the atmospheric air, in particular the atmospheric air in the urban environment.

4. The process as claimed in claim 1, at least one pollutant being a gaseous pollutant in the atmospheric air, preferably the greenhouse gas $CO_2$.

5. The process as claimed in claim 1, the bioreactor being a photobioreactor and the control parameters comprising parameters associated with the internal activity of the bioreactor, these parameters comprising one or more data chosen from: the pH, the temperature, the turbidity, the conductivity measured in the culture medium of the bioreactor, and the luminous flux received by the culture medium of the bioreactor.

6. The process as claimed in claim 1, the control parameters comprising measurement data of the level of the wastewater present in the sanitation network.

7. The process as claimed in claim 1, the control parameters comprising measurement data and/or weather forecasts.

8. The process as claimed in claim 1, further comprising management rules for determining the volume of biomass to be drained off.

9. The process as claimed in claim 1, the bioreactor comprising remotely controllable actuators and/or measurement sensors for controlling the activity of the reactor.

10. The process as claimed in claim 1, comprising a step of receiving the data associated with a plurality of bioreactors connected to one and the same sanitation network, which sanitation network is potentially connected to one or more biogas production plants.

11. The process as claimed in claim 10, wherein the plurality of bioreactors is connected to one and the same water supply network for supplying the culture medium of the bioreactors.

12. The process as claimed in claim 11, comprising a step of controlling the plurality of bioreactors according to geolocation data of said bioreactors, data associated with the state of the sanitation network and/or data associated with the state of the network supplying the bioreactor with water and/or data associated with the state of biogas production.

13. A computer program product, said computer program comprising code instructions for carrying out the steps of the process as claimed in claim 1, when said program is run on a computer.

14. An air treatment system comprising means for implementing the steps of the process as claimed in claim 1.

15. The system as claimed in claim 14, comprising a bioreactor, air inlets and outlets;

the bioreactor being configured to be connected to a sanitation network for draining off at least a portion of the biomass.

16. The system as claimed in claim 14, the bioreactor being a photobioreactor comprising photosynthetic microorganisms.

17. The system as claimed in claim 14, the bioreactor being connected to a water supply network for supplying the culture medium of the bioreactor.

18. The system as claimed in claim 14, the water supply network being a pretreated non-potable municipal water supply network.

19. The system as claimed in claim 17, further comprising a system for draining the bioreactor maintaining fluidic isolation between the water supply network and the sanitation network.

20. The system as claimed in claim 19, the drainage system comprising at least two reservoirs and remotely controllable electrically controlled valves, the reservoirs being configured to be drained alternately so as to maintain fluidic isolation between the water supply network and the sanitation network.

21. The system as claimed in claim 14, the bioreactor being connected to a heating network and/or a cooling network.

22. The system as claimed in claim 14, comprising one or more artificial light sources for controlling the activity of the bioreactor.

23. The system as claimed in claim 22, comprising one or more photovoltaic panels for supplying one or more artificial light sources with power.

24. The system as claimed in claim 14, comprising one or more sensors chosen from a pH meter, an interior thermometer, an exterior thermometer, an oxymetry probe, a level sensor, a conductivity sensor for measuring the conductivity of the culture medium, a sensor for measuring the level of $CO_2$ in the air of the bioreactor and/or of the atmosphere, a sensor for measuring the level of $O_2$ in the area of the bioreactor and/or the atmosphere and a sensor for measuring the dissolved $CO_2$ in the culture medium of the biomass.

25. The system as claimed in claim 14, the bioreactor further comprising one or more actuators for controlling the inlet and/or outlet air flow rates, and/or for agitating the biomass of the reactor, and/or for controlling the influx of natural and/or artificial light and/or for controlling the temperature.

26. The system as claimed in claim 14, further comprising a communication device allowing the activity of the bioreactor to be remotely controlled.

27. The system comprising a plurality of bioreactors as claimed in claim 14.

28. The system as claimed in claim 27, one or more bioreactors being connected to one or more biogas production devices.

* * * * *